(12) United States Patent
Muscarnera et al.

(10) Patent No.: US 12,309,903 B2
(45) Date of Patent: May 20, 2025

(54) INDUCTOR AND CORRESPONDING MAINTENANCE METHOD

(71) Applicant: DANIELI AUTOMATION S.P.A., Buttrio (IT)

(72) Inventors: Giuseppe Muscarnera, Siano (IT); Enzo Gigante, Porpetto (IT)

(73) Assignee: DANIELI AUTOMATION S.P.A., Buttrio (IT)

( * ) Notice: Subject to any disclaimer, the term of this patent is extended or adjusted under 35 U.S.C. 154(b) by 896 days.

(21) Appl. No.: 17/433,236

(22) PCT Filed: Feb. 21, 2020

(86) PCT No.: PCT/IT2020/050035
§ 371 (c)(1),
(2) Date: Aug. 23, 2021

(87) PCT Pub. No.: WO2020/170284
PCT Pub. Date: Aug. 27, 2020

(65) Prior Publication Data
US 2022/0124882 A1   Apr. 21, 2022

(30) Foreign Application Priority Data
Feb. 21, 2019   (IT) .............................. 1020190000025

(51) Int. Cl.
*H05B 6/36*   (2006.01)
*H05B 6/06*   (2006.01)
*H05B 6/10*   (2006.01)

(52) U.S. Cl.
CPC ................. *H05B 6/36* (2013.01); *H05B 6/06* (2013.01); *H05B 6/104* (2013.01)

(58) Field of Classification Search
CPC ........ B22D 11/1213; F27B 9/067; F27B 9/28; F27D 11/06; F27D 11/12; H05B 6/06; H05B 6/104; H05B 6/36; Y02P 10/25
USPC ....... 219/602, 604, 607, 610, 635, 639, 643, 219/644, 645, 646, 672
See application file for complete search history.

(56) References Cited

U.S. PATENT DOCUMENTS

| 2,386,819 | A | * | 10/1945 | Sherman | .................. | H05B 6/22 |
| | | | | | | 219/674 |
| 4,532,398 | A | | 7/1985 | Henriksson | | |
| 5,425,048 | A | | 6/1995 | Heine et al. | | |
| 2006/0000826 | A1 | | 1/2006 | Cordier et al. | | |

(Continued)

FOREIGN PATENT DOCUMENTS

| CN | 204388567 U | * | 6/2015 |
| FR | 2 495 752 A1 | | 6/1982 |
| GB | 1 580 932 A | | 12/1980 |

OTHER PUBLICATIONS

International Search Report and Written Opinion issued in PCT/IT2020/050035, mailed Apr. 22, 2020.

(Continued)

*Primary Examiner* — Quang T Van
(74) *Attorney, Agent, or Firm* — MARSHALL, GERSTEIN & BORUN LLP (57) ABSTRACT

An inductor to heat, by electromagnetic induction, an electrically conductive body, including an induction body, hollow inside, suitable to generate an electromagnetic field, the internal surface of which defines a containing seating, disposed through in a longitudinal direction.

12 Claims, 4 Drawing Sheets

(56) References Cited

U.S. PATENT DOCUMENTS

2018/0359816 A1 12/2018 Sitwala et al.
2022/0146198 A1* 5/2022 Muscarnera ............ C21D 1/42

OTHER PUBLICATIONS

International Preliminary Report on Patentability issued in PCT/IT2020/050035, mailed May 27, 2021.

* cited by examiner

INDUCTOR AND CORRESPONDING MAINTENANCE METHOD

FIELD OF THE INVENTION

The present invention concerns an inductor to heat an electrically conductive body by electromagnetic induction. The invention also concerns a method for the maintenance of the inductor.

BACKGROUND OF THE INVENTION

It is known, mostly in the metallurgical and iron and steel industry, to use rapid heating devices that use induction systems to perform heating steps of a metal element being worked, for example a bar, a billet or a bloom.

As is known, induction heating uses the electromagnetic induction principle to heat an electrically conductive material by Joule effect.

Induction furnaces are known, which comprise a containing body, inside which there is a coil, which is powered by alternating current at an appropriate frequency. The coil can consist of a tube wound in spirals, possibly associated with cooling systems, and the alternating electric current that circulates in the coil generates an alternating magnetic field, which in turn generates induced currents in a conductive metal material which is affected by the magnetic field.

It is also known that induction heating modes can provide longitudinal flow induction or transverse flow induction.

In known induction furnaces, typically, the coil is embedded in an insulating material, typically a refractory material, such as for example refractory cement.

The presence of the insulating material serves to protect the coil thermally and prevent the billet or bloom at high temperature, possibly incandescent, from damaging the coil.

The insulating material also performs a function of acoustic insulation and damping of the vibrations to which the spirals of the coil are subjected when subjected to the passage of high frequency alternating current.

It is also known that the insulating material performs a mechanical protection function of the coil, protecting it from possible knocks or impacts with the billet or bloom in transit through the inductor.

Inductors known in the state of the art can also provide front screens or faces, for example metal and typically copper.

The faces act as guides for inserting the billet or bloom into the inductor, and can also protect the insulating material from accidental impacts with the ends of the billet or bloom at entry or exit.

It is known that these prior art inductors are made monolithically, that is in such a way that the insulating material, the coil and the faces are attached together as a single piece.

In particular, the production of the monolithic inductors provides that the coil and the faces are inserted in a centering mold, in which the insulating material is subsequently cast.

Once the insulating material solidifies, the monolithic piece is positioned in the containing body, typically made of polyester glass, for example GPO3.

During the operating cycles, the insulating material is subjected to repeated changes in temperature, due to the continuous passage of billets which are heated on each occasion.

These changes in temperature induce the formation of cracks in the insulating material, which therefore tends to wear out.

In the state of the art, the wear of the insulating material can be further accelerated by impacts with the billet being worked, which in the worst cases can possibly cause the billet to get stuck or even melt inside the transit channel.

Furthermore, the vibrations of the coil, when high frequency alternating current passes through it, can further accelerate the wear of the insulating material.

Because of these and other disadvantages, after a certain number of operating cycles, known monolithic inductors need the insulating material to be reconditioned.

Maintenance and reconditioning operations are very onerous, because they require removing the inductor from the processing plant and transporting it to a special plant, where the insulating material is removed and the coil is recovered, if possible, and then proceed with a new cast of insulating material and the addition of new faces.

In known solutions, moreover, in the event of problems or malfunctions in the coil, it is necessary to replace the entire monolithic inductor, as it is not possible to access the spirals unless the refractory material in which it is embedded is broken.

It is also known that, following the reconditioning of the insulating material, drying cycles and operations are required before the inductor can be used again in a processing plant, with a further increase in maintenance costs and times.

Due to these extremely onerous operations, in some cases it may take a long time from when the inductor is disassembled from the production line to when it is reassembled.

U.S. Pat. No. 4,532,398 describes an inductor comprising a coil, an external casing and an internal through channel for the pieces to be heated. The region of the external casing closest to the coil consists of a layer of an elastic compound cast around the coil, on the outside of which there is a cement casing. Inside the coil there is a refractory lining that can be made as a prefabricated ceramic tube. The solution described in U.S. Pat. No. 4,532,398 does not allow to replace, or carry out maintenance operations on, the refractory lining, directly in the production plant.

Other known inductors are described, for example, in FR-A-2 495 752, US-A-2018/359816, U.S. Pat. No. 5,425,048 and US-A-2006/000826. These inductors have the disadvantages as described above.

There is therefore the need to develop new inductors that can overcome or at least limit the disadvantages of the state of the art.

One purpose of the present invention is to develop an inductor which requires less onerous maintenance operations, both in terms of times and in terms of costs.

Another purpose of the present invention is to develop an inductor that requires maintenance operations that can be carried out while leaving the inductor in the production plant, thus reducing the costs associated with transport to a specific plant.

Another purpose of the present invention is to increase the useful life of the inductor.

Another purpose of the present invention is to provide an inductor that allows maintenance operations to be carried out also on the coil, and directly in the production plant, in order to prevent possible malfunctions thereof.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

The present invention concerns embodiments of an inductor to heat an electrically conductive body by electromagnetic induction.

The present invention can refer in particular to inductors for metal products, for example obtained by casting, and possibly to be subjected to subsequent processes, such as billets or blooms.

In some embodiments, the inductor comprises a containing body, inside which an induction body is housed, having a tubular shape, defining a transit channel, through which, during use, an electrically conductive body, or a metal product to be heated, is made to pass.

The induction body comprises a coil configured to generate an alternating magnetic field inside it, which is suitable to heat the metal product passing through it.

An internal surface of the induction body, or the internal surface of the spirals of the coil, defines a containing seating, disposed passing through a longitudinal direction of the inductor.

In some embodiments, the inductor also comprises an insulating body, having a tubular shape and hollow inside, which is suitable for the thermal insulation of the coil.

According to one aspect of the present invention, the insulating body is configured to be inserted in, and extracted from, the containing seating, so that it can be replaced, or to allow access to the coil around it.

Advantageously, this allows the insulating body to be removed and reconditioned, without necessarily removing the entire inductor, when the insulating body reaches a condition of wear or non-efficiency.

An internal surface of the insulating body defines the transit channel, suitable for the passage, during use, of the electrically conductive body.

According to further embodiments, the inductor also comprises a front head and a rear head, positioned on respective opposite faces of the inductor, and provided with apertures consistent and aligned with the transit channel. The heads are removable and are configured to be assembled and disassembled to allow the insertion and removal of the insulating body into/from the containing seating.

According to some embodiments, interstices can be present which separate the insulating body from the other components of the inductor, such as for example the induction body, both in the radial direction with respect to the axis of the transit channel, and in the longitudinal or axial direction, with respect to the axis of the transit channel.

In some embodiments, in one or more of these interstices there are interposition means, which perform functions of thermal insulation and/or mechanical protection of the various components of the inductor, in particular of the induction body and of the insulating body, from impacts, vibrations, or stresses in the longitudinal and/or radial directions.

In some embodiments of the present invention, the insulating body and the interposition means can be inserted into and extracted from the inductor, or from the containing body, as needed.

According to some embodiments, the coil is configured to be removable from the containing body of the inductor.

According to possible embodiments, the coil and insulating body are provided with respective thermal and mechanical coupling means which allow a reciprocal coupling of the removable type and define an assembly that can be handled in its entirety to be inserted into and/or removed from the inductor body.

Advantageously, the inductor of the present invention can therefore be completely dismantled and repaired in situ, that is, it is not necessary to completely remove the inductor from the plant, and send it to specific sites, to perform maintenance and reconditioning operations of the insulating material.

According to some embodiments, the inductor body comprises an at least partly removable upper wall to allow the removal and/or insertion of the assembly defined by the coil and insulating body coupled with each other.

This solution allows to carry out maintenance operations without having to move the inductor from the production line, significantly reducing both time and costs in terms of machine downtime and movement, as normally required by inductors known in the state of the art.

The present invention also concerns a method for the maintenance of an inductor of the type described above.

The method includes the steps of:
disassembling the inductor by removing the front and rear heads from the containing body;
removing at least the insulating body from the containing body;
performing at least one maintenance operation on the coil, or replacing the insulating body;
assembling the inductor by reinserting at least one insulating body into the containing body;
repositioning the front and rear heads and attaching them to the containing body.

According to some embodiments, the method can provide to turn off the inductor, possibly making it cool down, before disassembling it and removing the heads, and turning it back on after repositioning the heads.

In some embodiments, the disassembly step can include the extraction of only the insulating body from the containing seating.

In some embodiments, the assembly step includes the insertion of the insulating body in the containing seating.

If it is sufficient to remove/insert only the insulating body, the method provides to move the insulating body in an axial direction, through the lateral apertures of the containing body, removing and positioning the heads associated with the containing body in a suitable manner.

In some embodiments, the at least one maintenance operation comprises the replacement of the insulating body with a new insulating body.

Advantageously, the maintenance method of the present invention therefore allows to carry out all or most of the maintenance operations in situ.

In particular, the method allows to carry out the reconditioning operations of the insulating material in situ, for example by extracting a damaged insulating body and replacing it with a new insulating body.

This characteristic allows to overcome the disadvantages of the state of the art whereby the maintenance and reconditioning operations of the insulating material are very onerous, both in terms of costs and in terms of times.

This characteristic also allows at least part of the drying operations of the insulating material to be carried out directly on the insulating body, before it is inserted into a new inductor, further reducing maintenance times.

In some embodiments it is also possible to supply insulating bodies specifically designed and made with suitable materials so as not to require drying operations before being inserted in the containing seating.

According to further embodiments, the maintenance method provides to remove the coil with the insulating body inserted inside it, where the coil and insulating body are coupled with respective thermal and mechanical coupling means and define an assembly that can be handled in its entirety.

According to these embodiments, the method provides to remove the coil-insulating body assembly through an upper aperture of the containing body.

In this way it is possible to carry out maintenance on the inductor without having to remove it even from the production line.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawing. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Embodiments of the present invention concern an inductor 10 suitable for the induction heating of a conductive metal body in transit.

The inductor 10 comprises a transit channel 11 made passing through it, which develops along a transit axis X and in which the metal body to be heated passes during use.

The inductor 10 can be of the type suitable for the generation of a longitudinal magnetic flow, or a transverse magnetic flow.

For example, in embodiments described with reference to FIG. 1, the inductor 10 can be of the type suitable to generate a longitudinal flow, that is, with the field lines parallel to the longitudinal development of the transit channel 11 along the transit axis X.

Figure 3:
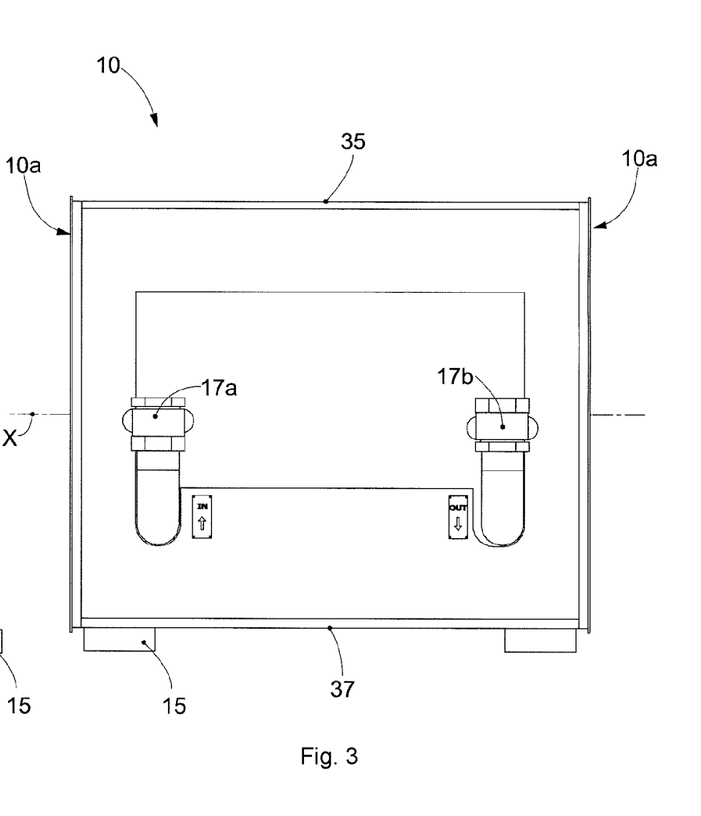
FIG. 3 is a lateral view of an inductor according to some embodiments of the present invention.

It is therefore possible to orient the inductor 10 in a longitudinal direction, defining a front face 10a, on the side where the conductive metal body enters the inductor 10, and a rear face 10b, on the side where the conductive metal body exits the inductor 10, shown by way of example in FIG. 3.

The transit channel 11 has sizes such as to allow the passage of a metal body through it, that is, the cross section of the transit channel 11 is bigger than the cross section of the conductive metal body.

In some embodiments, the present invention can concern inductors 10 for billets, in which case the conductive metal body is a billet.

The present invention can also concern the treatment of blooms, bars, ingots or any other comparable or similar metal product.

Figures 1, 1A:
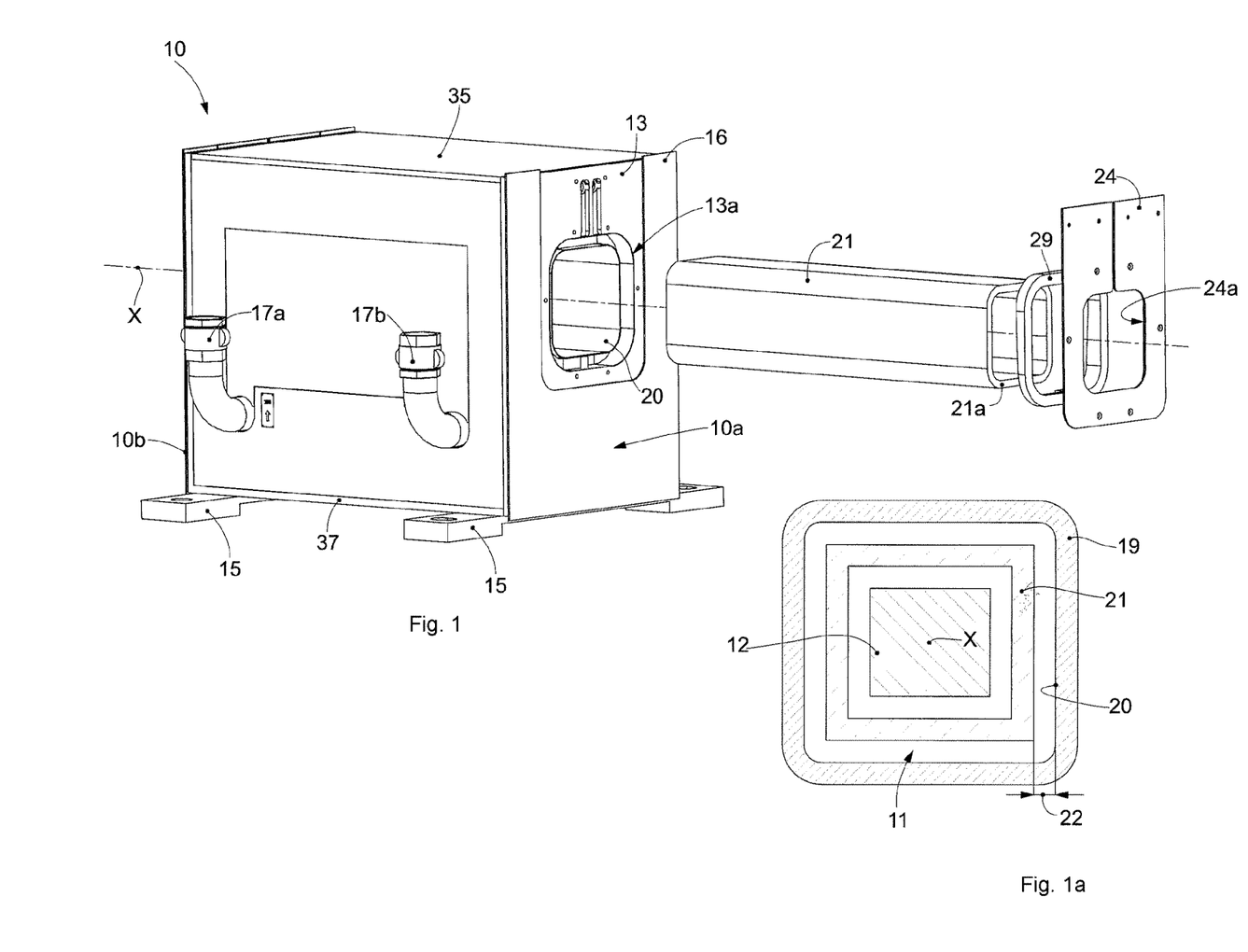
FIG. 1 is a lateral view of an inductor according to some embodiments of the present invention.
FIG. 1a is a section view of part of a billet and an inductor according to some embodiments of the present invention.
Figure 2:
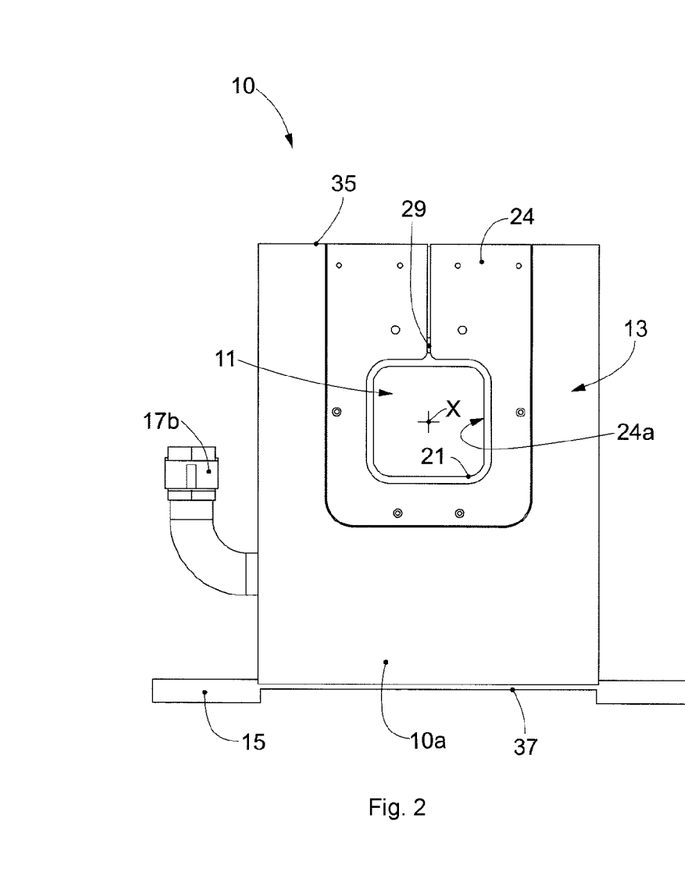
FIG. 2 is a front view of an inductor according to some embodiments of the present invention.

By way of explanation, FIG. 1a shows a billet 12, although not properly part of the inductor 10.

According to some embodiments, the inductor 10 comprises a containing body 13, inside which an induction body 19 is disposed, suitable to generate an electromagnetic field through it.

According to some embodiments, the induction body 19 comprises a coil 14.

In some embodiments, the coil 14 is made of conductive material and configured to be powered by alternating current at an appropriate frequency, possibly high frequency, and generate an electromagnetic field inside it.

In some embodiments, the coil 14 is made as a hollow tube of conductive material, inside which the cooling liquid flows.

In some embodiments, the coil 14 is made as an elongated body with a constant section of conductive material.

In some embodiments, the median part of the coil 14 is wound in a spiral around the transit channel 11, thus defining a plurality of spirals 14a, while the two terminal portions 14b, 14c are directed towards respective apertures 13a, 13b of the containing body 13.

The terminal portions 14b, 14c each have the terminal ends 14d, 14e configured for connection with a power supply.

In some embodiments, the power supply is suitable to supply alternating electric current, possibly at high frequency, to the coil 14.

When the power supply is activated, an alternating induced magnetic field is generated inside the coil 14, and therefore inside the transit channel 11, which in turn induces currents induced in the billet 12 in transit, producing thermal energy by the Joule effect.

In some embodiments, the presence of a converter to convert direct current into alternating current can be provided.

According to some embodiments, the coil 14 can be connected to flanges or positioning elements suitable to be attached to the containing body 13 to guarantee a stable positioning of the coil 14 inside it.

In embodiments described with reference to FIG. 4, the median part of the coil 14 can be embedded in a binding material 18, typically but not exclusively refractory cement.

The binding material 18 performs a function of thermal insulation of the spirals 14a from the heat generated by the billet in transit, a function of damping the vibrations to which the spirals 14a are subjected when powered by high frequency alternating current, and a function of acoustic insulation.

The coil 14 embedded in the binding material 18 therefore defines an induction body 19, hollow inside, suitable to generate the alternating magnetic field inside it.

According to possible variants, for example described with reference to FIG. 5, the coil 14 itself defines the induction body 19.

According to some embodiments, the spirals 14a can be attached and clamped to each other by means of attachment members 31.

According to some embodiments, the attachment members 31 can comprise bars 32, or other oblong elements, disposed in contact with a surface of the spirals 14a facing outward, attached to them by means of removable attachment elements 33 such as screws, pins, and suchlike.

For example, two or more bars can be provided—in the case shown here four—positioned distanced from each other around the coil 14, so as to guarantee a stable reciprocal positioning of the spirals 14a on their entire perimeter and for their entire development.

According to this solution, the coil 14 is not incorporated in refractory material, or cement.

This solution allows to minimize the concrete components, and therefore the wear problems related to them, and consequently to increase the useful life of the inductor 10.

According to further embodiments, the coil 14 can be isolated by coating with taping and insulating varnishes, or by a resin-coating process with thermally resistant materials.

In any case, the spirals 14a are visible from the external side of the coil 14, facilitating the inspection and verification of the state of the active part of the inductor 10, for example through an upper aperture 36.

These embodiments make it possible to inspect and possibly replace the coil 14 by anticipating and/or preventing a possible electrical fault due to the failure of the insulation or possibly overcurrents which can be harmful to the converter devices connected upstream of the coil 14.

According to some embodiments, the upper aperture 36 can have a passage section suitable to allow the coil 14 to pass through it in a vertical direction.

Figure 5:
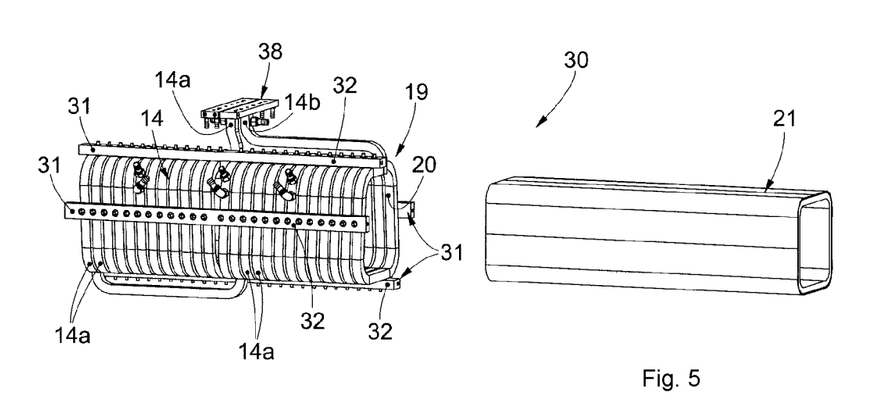
FIG. 5 is a view of two components of the inductor according to possible variants of the present invention.

The internal surface of the induction body 19, or of the spirals 14a, defines a containing seating 20, made passing through the longitudinal development of the inductor 10, and having a cross section bigger than the section of the transit channel 11, as shown by way of example in FIGS. 1a and 5.

In some embodiments, the containing body 13 is configured to contain different components of the inductor 10 inside it, as well as the induction body 19, and can be made in a single body or as a plurality of elements connected to each other.

The containing body 13 can have a box-like shape, defined, as well as by the front and rear faces 10a, 10b, by respective lateral walls 34a, 34b, disposed facing each other, and connected between the two faces 10a, 10b.

The containing body 13 can also comprise an upper wall 35 and a lower wall 37.

In some embodiments, the containing body 13 can comprise anchoring means 15 suitable to anchor the inductor 10 to the ground.

In some embodiments, the containing body 13 can comprise a plurality of covering plates 16, for the purpose of thermal and/or electrical and/or acoustic insulation, and/or protection.

In some embodiments, inside the containing body 13 there is a cooling system 17, or part of a cooling system 17, configured to cool the coil 14, and comprising, for example, circuits, pipes, one or more inlet valves 17a and one or more discharge valves 17b for a cooling liquid.

In some embodiments, the containing body 13 has two apertures 13a, 13b on two opposing faces 10a, 10b, consistent with the containing seating 20.

According to some embodiments, the inductor 10 according to the present invention comprises an insulating body 21, hollow inside and suitable to be inserted into, and extracted from, the containing seating 20 of the induction body 19, or of the coil 14, and whose internal surface defines the wall of the transit channel 11.

In embodiments described for example with reference to FIGS. 1, 1a, 5 and 6, the insulating body 21 can be conformed as a hollow tubular body, which has an external cross section smaller than the section of the containing seating 20 and an internal cross section bigger than the section of the billet 12 in transit.

The insulating body 21 is made as a separate component, separated and independent from the coil 14 and from the induction body 19, and able to be inserted in a containing seating 20 defined by them.

According to some embodiments, the apertures 13a, 13b of the containing body 13 have a bigger section than the external section of the insulating body 21, so as to allow the transit of the insulating body 21 during insertion and removal into/from the containing seating 20.

Figure 4:
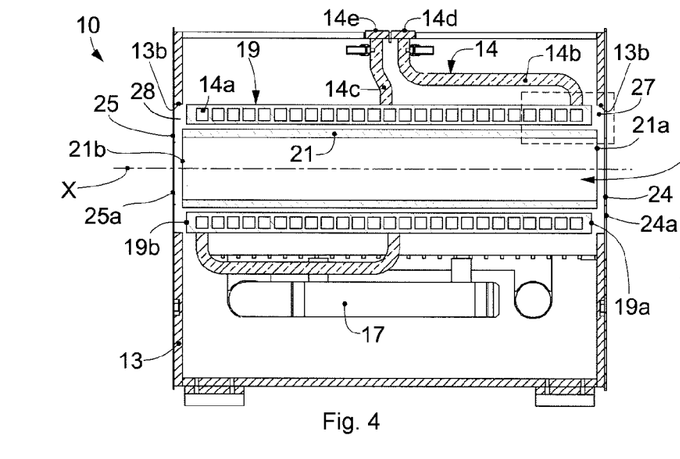
FIG. 4 is a section view of an inductor according to some embodiments of the present invention.

In the embodiments described by FIG. 4, the insulating body 21 can have a longitudinal development consistent with the longitudinal development of the containing seating 20, in such a way as to position itself between the billet 12 in transit and the coil 14 along the entire longitudinal development of the induction body 19.

The front end 21a and the rear end 21b of the insulating body 21 can be located in the proximity of the front face 10a and rear face 10b of the inductor 10 respectively.

In some embodiments, the insulating body 21 is configured for the thermal insulation of the induction body 19, for example to protect the coil 14 of the induction body 19 from the heat generated, during use, during the transit of the billet 12 through the inductor 10.

In some embodiments, the insulating body 21 is made of a refractory material, for example refractory cement.

According to other embodiments, it can be provided that the insulating body 21 is made of basaltic material, which is completely waterproof and mechanically resistant.

Its impermeability at any temperature makes the insulating body 21 made of basaltic material suitable to be used immediately after installation, without needing to carry out long drying processes, or "dry-outs", normally required when the passage pipes for the billets 12 or metal products in general are made of refractory cement.

Furthermore, the use of basaltic material allows the inductor 10 to be used even in the proximity of a descaling line, as it is naturally resistant to the residual water that is carried by the billet 12 into the inductor 10.

The possibility of removing the insulating body 21 separately from the coil 14 means that when, after a certain number of working cycles, the insulating material is damaged and worn, it is sufficient to replace only the insulating body 21, in order to put the inductor 10 back into operation.

According to variant embodiments, the coil 14 and the insulating body 21 are provided with respective thermal and mechanical coupling means which allow a stable but removable reciprocal coupling, defining an induction assembly 30 which can be handled and moved as a single body.

These characteristics allow to significantly speed up the maintenance times of the inductor 10 compared with the monolithic inductors of the state of the art, in which it is necessary to remove the inductor from the processing plant and remove the monolith formed by coil and refractory cement, in order to condition the insulating material.

This characteristic also allows to reduce the maintenance costs of the inductor 10 and of the plants that use the inductor 10, since it is not necessary to stop the plant for long periods during the maintenance operations on the inductor 10.

In some embodiments, the external wall of the insulating body 21 can have protuberances, guides, protrusions, beads, in any zone of the longitudinal development, with functions of support and self-centering.

Figure 4A:
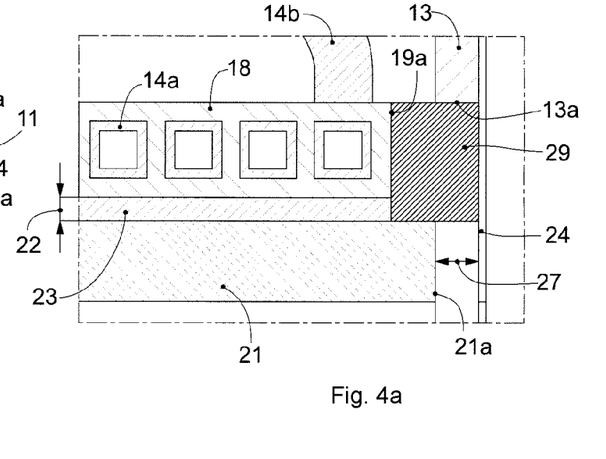
FIGS. 4a, 4b, 4c are enlargements relating to the frame in FIG. 4, which show variants of an inductor according to some embodiments of the present invention.
Figure 4B:
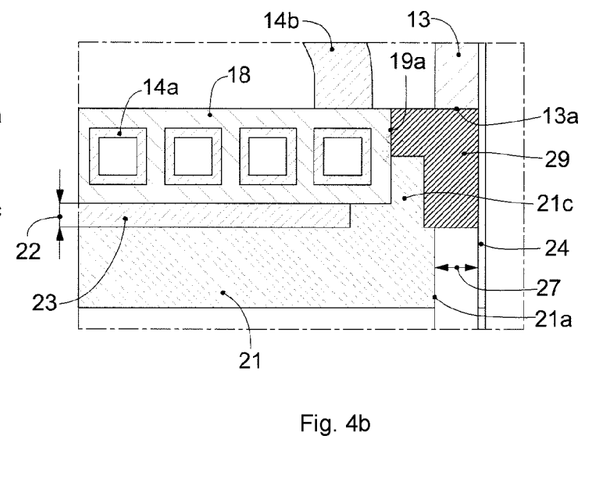

According to embodiments shown in FIG. 4b, the insulating body 21 can have, by way of example, an abutment bead 21c on a terminal end, for example in correspondence with the front face 10a, configured to position itself in abutment against the end of the induction body 19.

Figure 4C:
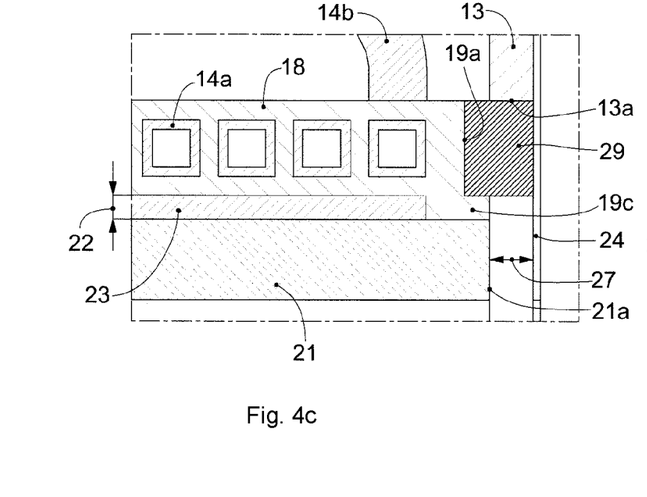

In some embodiments, for example described by FIG. 4c, the induction body 19 can have protuberances, guides, protrusions, beads, with functions of support and centering.

According to some embodiments, it can be provided that the binding material 18 is shaped in such a way as to define a guide portion 19c in correspondence with the front face 10a, suitable to cooperate with the insulating body 21 in order to keep it in position.

According to some embodiments, the inductor 10 comprises an interposition mean 23 disposed between the induction body 19, or the coil 14, and the insulating body 21.

Advantageously, the first interposition mean 23 can be made of a material suitable to allow a free radial deformation of the tubular insulating body 21 due to the thermal effect, without interfering with the induction body 19 or with the coil 14 possibly cast in the binding material 18.

The first interposition mean 23 can also be configured to perform a thermal insulation function of the induction body 19.

In some embodiments, the first interposition mean 23 can also be suitable to absorb mechanical stresses in the radial direction, for example vibrations, coming from the spirals 14a of the coil 14 when powered, which therefore are not discharged onto the insulating body 21.

In some embodiments, the first interposition mean 23 can be an insulating cloth.

According to embodiments described with reference to FIGS. 4a, 4b, 4c, the first interposition mean 23 can be inserted in a radial interstice 22.

According to embodiments shown in FIGS. 4, 4a, 4b, 4c, the radial interstice 22 extends between the internal surface of the containing seating 20 and the external surface of the insulating body 21, along part or all of the longitudinal development of the induction body 19 and of the insulating body 21.

Thanks to the radial interstice 22, the material of which the insulating body 21 is made is not in direct contact with the induction body 19 and/or the spirals 14a.

This characteristic means that deformations and/or vibrations in the longitudinal direction, to which the spirals 14a are subjected due to the thermal effect and/or the high frequency magnetic field, do not directly affect the insulating body 21.

This has the effect of reducing wear and lengthening the useful life of the insulating body 21, reducing the need for maintenance operations.

The presence of the interstice 22, together with the interposition mean 23, allows to absorb both the mechanical stresses of the coil 14 and those of the insulating body 21.

The inductor 10 according to the present invention also comprises a front head 24 and a rear head 25, which are applied respectively on the front face 10a and rear face 10b in correspondence with the respective apertures 13a, 13b of the containing body 13.

The heads 24, 25 have passage apertures 24a, 25a in correspondence respectively with the front end 21a and the rear end 21b of the insulating body 21.

In some embodiments, the passage apertures 24a, 25a are consistent and aligned with the transit channel 11 and allow the billet 12 to pass through the inductor 10.

According to some embodiments, the passage apertures 24a, 25a have a section smaller than the internal section of the insulating body 21, so as to guarantee the correct positioning of the latter inside the containing body 13.

In some embodiments, the heads 24, 25 are made of copper.

In some embodiments, the heads 24, 25 have suitable attachment means, for example holes for attachment screws or bolts, to be easily mounted on and removed from the respective faces 10a, 10b of the containing body 13, to allow the insertion or the extraction of the insulating body 21 into/from the containing seating 20.

In some embodiments, the heads 24, 25 perform a protection and support function of the insulating body 21 inserted in the inductor 10.

In embodiments described by FIGS. 4, 4a, 4b, 4c, the presence of two interstices is also provided, and in particular of a front interstice 27 and a rear interstice 28.

In some embodiments, the front interstice 27 extends longitudinally between the front head 24 and the front end 21a of the insulating body 21, while the rear interstice 28 extends longitudinally between the rear head 25 and the rear end 21b of the insulating body 21.

The presence of the interstices 27, 28 allows to keep the insulating body 21 aligned with the induction body 19, or the coil 14, even in the presence of axial and/or longitudinal thermal expansion.

The interstices 27, 28 also allow to prevent expansions in the longitudinal direction of the insulating body 21 from damaging the heads 24, 25 or the containing body 13.

In the embodiments described by FIGS. 4a, 4c, 4b the front interstice 27 can also extend between the front end 19a of the induction body 19, or of the coil 14, and the front head 24.

Similarly, the rear interstice 28 can also extend between the rear end 19b of the induction body 19 and the rear head 25.

In these embodiments, the front interstice 27 and rear interstice 28 allow to maintain the alignment of the induction body 19 inside the inductor 10 and to prevent expansions in the longitudinal direction of the induction body 19 from damaging the heads 24, 25 or the containing body 13.

In the embodiments described by FIGS. 4a, 4b, 4c, a second interposition mean 29 is provided in the front interstice 27 and/or in the rear interstice 28.

The second interposition mean 29 can be made of a material suitable to allow the axial thermal expansion of the insulating body 21 while maintaining alignment with the induction body 19.

According to some embodiments, the second interposition mean 29 can be made of refractory material.

According to further embodiments, the second interposition mean 29 can also be configured to absorb the mechanical stresses or vibrations of the induction body 19, coming for example from the spirals 14a of the coil 14 when powered, and/or the insulating body 21.

In embodiments described by FIG. 1, the second interposition mean 29 can have an annular shape, consistent with the cross section of the insulating body 21 and/or of the transit channel 11.

Figure 6:
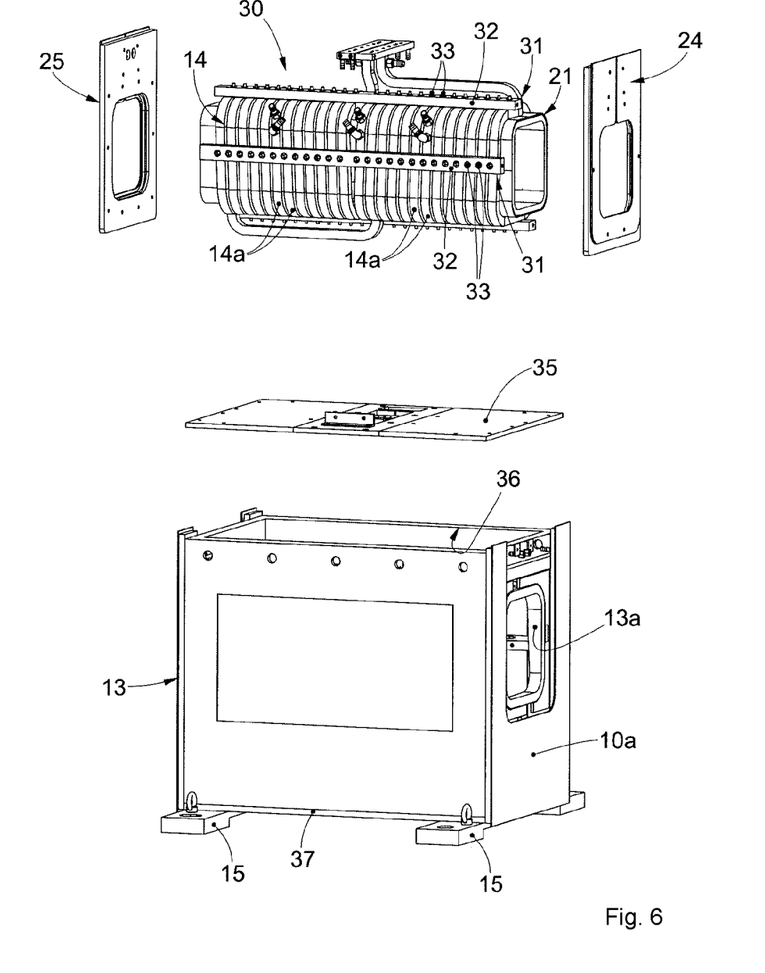
FIG. 6 is an exploded view of some components of an inductor according to other embodiments of the present invention.

According to some embodiments, for example visible in FIG. 6, the containing body 13 comprises the upper aperture 36 having a section suitable to allow the coil 14 to pass through it.

According to some embodiments, it can be provided that the upper wall 35 is removable, and that the upper aperture 36 is defined by the upper edges of the respective faces 10a, 10b and the lateral walls 34a, 34b.

According to possible variants, it can be provided that the upper aperture 36 is made in the upper wall 35 and there is a closing device suitable to close the upper aperture 36 during the normal use of the inductor 10.

The present invention also concerns a method for the maintenance of an inductor 10 in accordance with the present invention.

The maintenance method provides the steps of:
turning off the inductor 10;
disassembling the inductor 10 by removing the front head 24 and the rear head 25 from the containing body 13;
removing at least the insulating body 21 from the containing body 13;
performing at least one of either a maintenance operation on the coil 14, or a replacement of the insulating body 21;
reassembling the inductor 10 by reinserting at least one insulating body 21 into the containing body 13, which can be the insulating body 21 extracted before, or a new insulating body 21;
repositioning the front head 24 and rear head 25 and attaching them to the containing body 13;
turning on and restarting the inductor 10.

In some embodiments, the maintenance operations can provide to replace all or some of the components of the inductor 10, such as for example the insulating body 21, the first interposition mean 23 and/or the second interposition mean 29, without removing the inductor 10 from the production plant.

In some embodiments, maintenance operations include replacing damaged components with new ones.

In some embodiments, maintenance operations include repairing damaged components and reinserting them.

In some embodiments, maintenance operations include cleaning the components or the containing seating 20 of slag produced during the processing cycles and left deposited on the internal and/or external walls of the inductor 10.

In some embodiments, maintenance operations include maintenance operations on the cooling system 17, such as for example the replacement of the cooling liquid.

According to some embodiments, the step of disassembling the inductor 10 also comprises the steps of:
removing the heads 24, 25;
removing the second interposition mean 29;
extracting the insulating body 21 from the containing seating 20;
removing the first interposition mean 23 from the containing seating 20.

The step of assembling the inductor 10 can provide the steps of:
positioning the first interposition mean 23 on the internal wall of the containing seating 20;
inserting the insulating body 21 in the containing seating 20;
inserting the second interposition mean 29 on the front and/or rear portion of the insulating body 21 and/or of the induction body 19;
attaching the heads 24, 25 to the containing body 13 of the inductor 10 using the appropriate attachment means.

Advantageously, the method according to embodiments of the present invention provides that the inductor 10 can be disassembled and reassembled directly in situ in the processing plant, without having to be removed.

This characteristic has the advantages of not having to stop the system for long periods to carry out maintenance operations on the inductor 10.

According to further embodiments, the maintenance method can provide to remove the coil 14 with the insulating body 21 inserted inside it, where the coil 14 and the insulating body 21 are coupled with respective thermal and mechanical coupling means and define an assembly 30 that can be handled in its entirety.

According to some embodiments, the method can provide to remove the assembly 30 consisting of the coil 14 and the insulating body 21 through the upper aperture 36 of the containing body 13.

According to possible solutions, the method can provide to remove at least part of the upper wall 35 of the containing body 13, or possibly a closing device provided on it to make the upper aperture 36 accessible.

According to further embodiments, the method can also provide to keep the coil 14 inside the containing body 13 and carry out inspection operations on it through the upper aperture 36.

According to some embodiments, the method can provide to perform directly, with the inductor 10 installed in the production line, at least one of either the removal of the assembly 30 through the upper aperture 36 or the inspection/maintenance of the coil 14.

In some embodiments, it is provided that the insulating body 21 is dried before it can be used at the high operating temperatures of the inductor 10.

Advantageously, according to some embodiments of the present invention, the drying step can be carried out before the insulating body 21 is inserted into the inductor 10. This characteristic considerably simplifies maintenance operations compared with monolithic inductors, since only the insulating body 21 can be dried, and not the whole monolith.

Moreover, in some embodiments, the insulating body 21 can be made of a material that does not need to be dried before use in the inductor 10.

Furthermore, it is also an advantage that the wear or damage of one component of the inductor 10 does not require the replacement of the whole inductor 10, with a significant saving in terms of costs.

It is clear that modifications and/or additions of parts may be made to the inductor 10 and method as described heretofore, without departing from the field and scope of the present invention.

It is also clear that, although the present invention has been described with reference to some specific examples, a person of skill in the art shall certainly be able to achieve many other equivalent forms of inductor 10 and method, having the characteristics as set forth in the claims and hence all coming within the field of protection defined thereby.

The invention claimed is:

1. An inductor to heat, by electromagnetic induction, an electrically conductive body, wherein said inductor comprises:
   an induction body, provided with a coil suitable for the generation of an electromagnetic field inside it, wherein said coil is made as a hollow tube made by spirals,
   an insulating body conformed as a hollow tubular body disposed, during use, in a containing seating of said coil, suitable to be inserted into, and extracted from, said containing seating, and defining a transit channel for said electrically conductive body, and
   a containing body, configured to house said induction body and said insulating body, provided with apertures coherent with said transit channel, wherein said insulating body is removable from said induction body and wherein said inductor comprises a front head and a rear head, positioned respectively on a front face and a rear face of said containing body, provided with passage apertures aligned with said transit channel, wherein said front head and rear head are removable and are configured to be assembled onto and disassembled from said containing body to allow the insertion and extraction of said insulating body into/from said containing seating; and
   wherein said containing body comprises an upper aperture having a section suitable to allow the passage through it of said coil.

2. The inductor as in claim 1, wherein said insulating body consists of a tubular body made of refractory material.

3. The inductor as in claim 1, wherein said insulating body consists of a tubular body made of basaltic material.

4. The inductor as in claim 1, wherein the apertures of said containing body have a section bigger than the external section of the insulating body and said passage apertures have a section smaller than the internal section of the insulating body, in order to guarantee a correct positioning of the latter inside the containing body.

5. The inductor as in claim 1, comprising an interposition mean disposed in a radial interstice between said internal surface of said containing seating of the induction body and an external surface of said insulating body, wherein said interposition mean is configured to thermally insulate said induction body and protect said insulating body from mechanical stresses which develop at least in a radial direction.

6. The inductor as in claim 1, wherein said radial interstice along part or all of the longitudinal development of said induction body and/or of said insulating body.

7. The inductor as in claim 1, comprising at least one interstice that extends between at least one of said front or rear heads and a respective front end or rear end of said induction body.

8. The inductor as in claim 7, comprising an interposition mean, disposed in said at least one interstice, and configured to provide thermal insulation and to absorb mechanical stresses and thermal expansions of said insulating body in a longitudinal direction.

9. The inductor as in claim 1, wherein said coil and said insulating body are attached to one another thus defining an induction assembly that can be handled and moved as a single body.

10. A method for the maintenance of an inductor, comprising:
   providing an inductor comprising:
   an induction body provided with a coil suitable for the generation of an electromagnetic field inside it, wherein said coil is made as a hollow tube made by spirals;
   an insulating body conformed as a hollow tubular body disposed, during use, in a containing seating of said coil, suitable to be inserted into, and extracted from, said containing seating, and defining a transit channel for said electrically conductive body, and
   a containing body, configured to house said induction body and said insulating body, provided with apertures coherent with said transit channel, wherein said insulating body is removable from said induction body and wherein said inductor comprises a front head and a rear head, positioned respectively on a front face and a rear face of said containing body, provided with passage apertures aligned with said transit channel, wherein said front head and rear head are removable and are configured to be assembled onto and disassembled from said containing body to allow the insertion and extraction of said insulating body into/from said containing seating;
   the method further comprising disassembling said inductor by removing the front head and rear head from said containing body;
   removing together said coil and said insulating body inserted inside it, wherein said coil and said insulating body are attached to one another and define an assembly which can be handled in its entirety;
   removing said assembly of said coil and said insulating body through an upper aperture of the containing body in a vertical direction;
   extracting at least said insulating body from said containing body;
   performing at least one maintenance operation on said coil, or a replacement of said insulating body;
   re-assembling said inductor by re-inserting the insulating body which had been removed, or inserting a new insulating body in said containing body;
   repositioning and attaching said front head and rear head to said containing body.

11. The method as in claim 10, wherein said assembly operation of said inductor comprises inserting said insulating body into said containing seating and attaching said insulating body to said coil.

12. An inductor to heat, by electromagnetic induction, an electrically conductive body, wherein said inductor comprises:
   an induction body, provided with a coil suitable for the generation of an electromagnetic field inside it, wherein said coil is made as a hollow tube made by spirals,
   an insulating body conformed as a hollow tubular body disposed, during use, in a containing seating of said coil, suitable to be inserted into, and extracted from, said containing seating, and defining a transit channel for said electrically conductive body, and
   a containing body, configured to house said induction body and said insulating body, provided with apertures coherent with said transit channel, wherein said insulating body is removable from said induction body and wherein said inductor comprises a front head and a rear head, positioned respectively on a front face and a rear face of said containing body, provided with passage apertures aligned with said transit channel, wherein said front head and rear head are removable and are configured to be assembled onto and disassembled from said containing body to allow the insertion and extraction of said insulating body into/from said containing seating;

wherein said inductor is configured to be disassembled by removing the front head and rear head from said containing body;

said insulating body is configured to be extracted from said containing body to thereby permit the performance of at least one maintenance operation on said coil, or a replacement of said insulating body;

said inductor is configured to be re-assembled by re-inserting the insulating body which had been removed, or inserting a new insulating body in said containing body; and said front head and rear head are configured to be repositioned and reattached to said containing body; and and further wherein the inductor is configured to maintain said coil inside said containing body and to allow inspection and maintenance operations through an upper aperture of said containing body.

\* \* \* \* \*